UNITED STATES PATENT OFFICE.

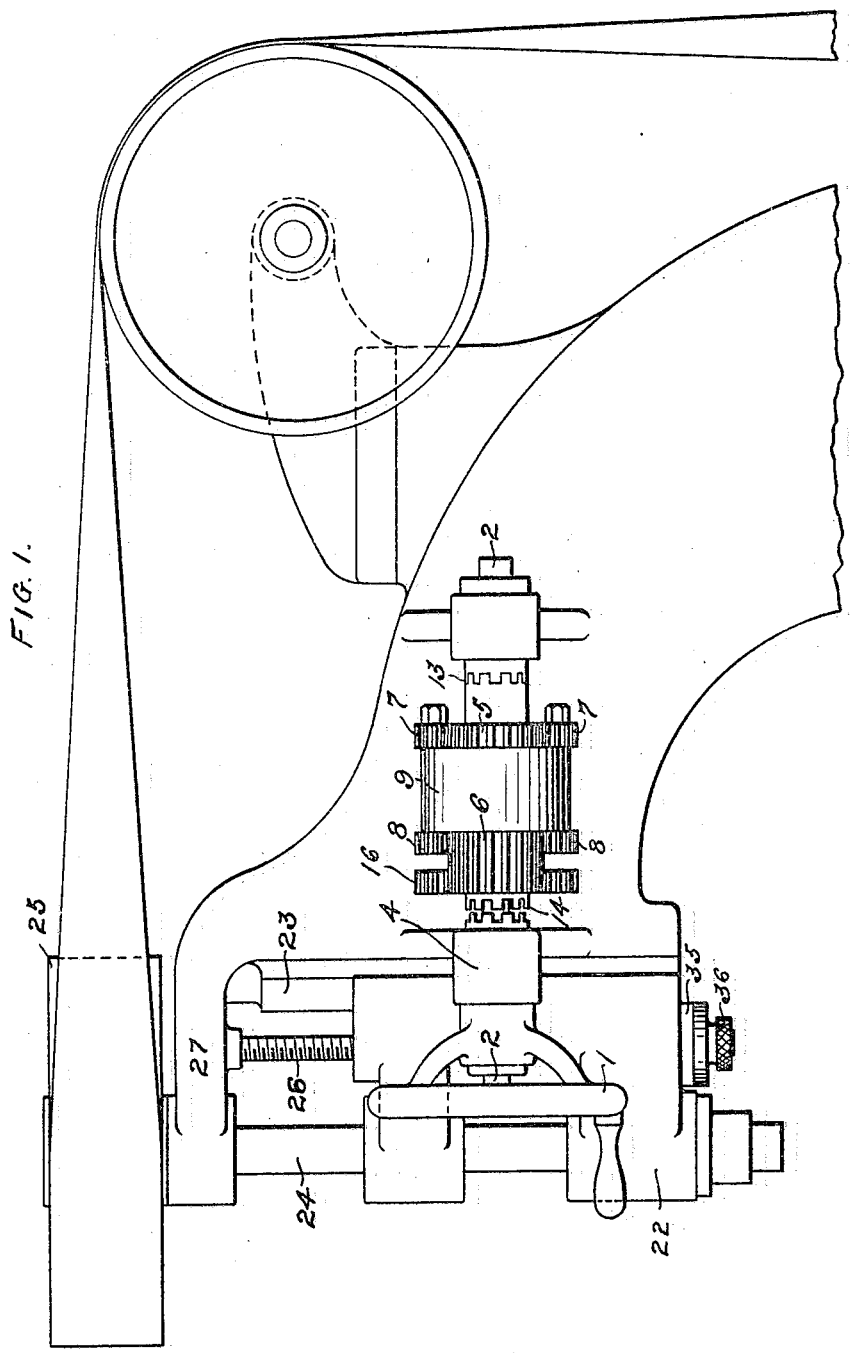

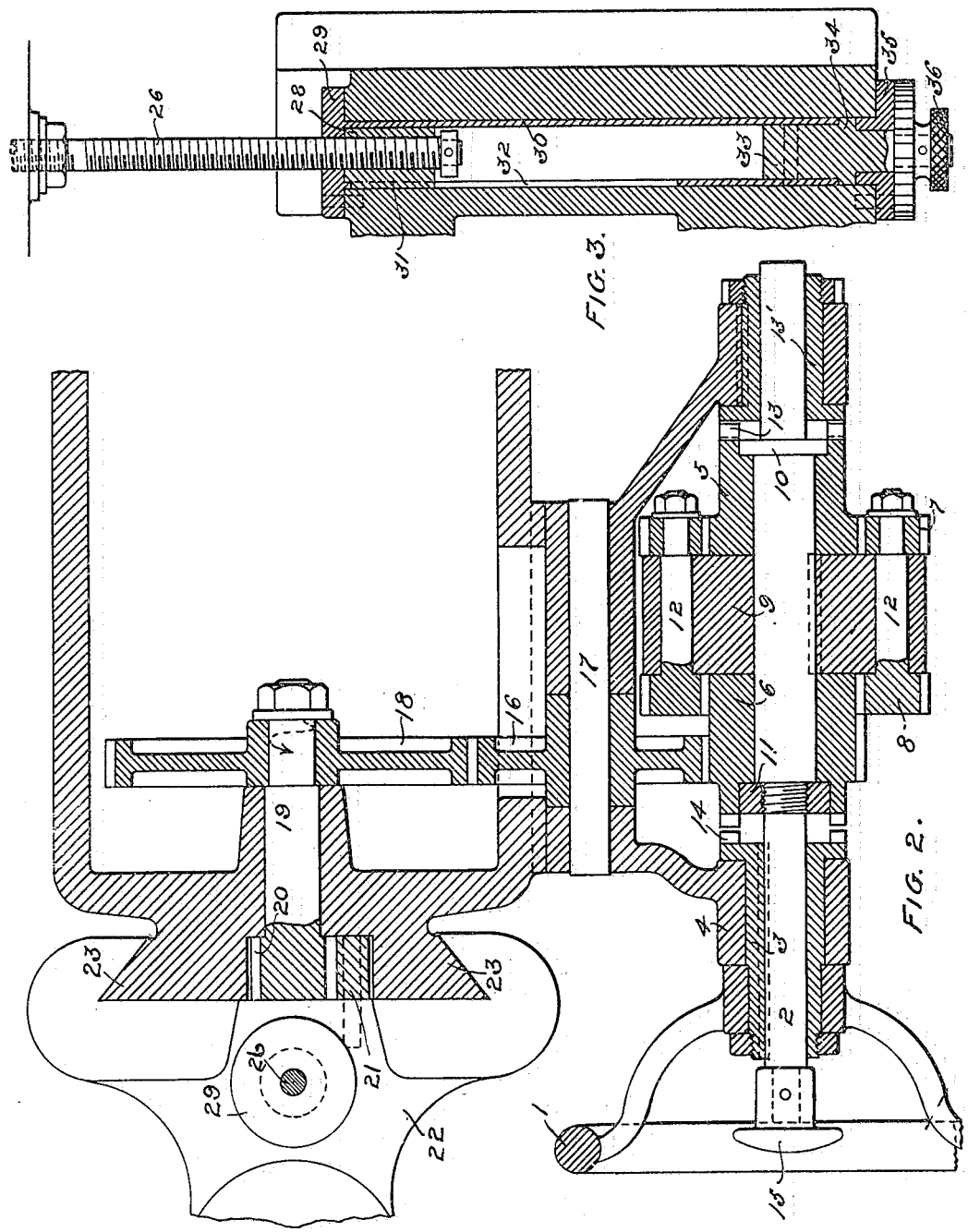

CHARLES R. GABRIEL, OF PROVIDENCE, RHODE ISLAND, ASSIGNOR TO BROWN & SHARPE MANUFACTURING COMPANY, OF PROVIDENCE, RHODE ISLAND, A CORPORATION OF RHODE ISLAND.

GEARING.

No. 809,915.      Specification of Letters Patent.      Patented Jan. 9, 1906.

Original application filed March 1, 1899, Serial No. 707,298. Divided and this application filed October 11, 1900. Serial No. 32,702.

*To all whom it may concern:*

Be it known that I, CHARLES R. GABRIEL, of the city and county of Providence and State of Rhode Island, have invented certain new and useful Improvements in Gearing; and I do hereby declare the following specification, taken in connection with the accompanying drawings, forming a part of the same, to be a full, clear, and exact description thereof.

The invention relates to mechanism for effecting either a slow or rapid feed or movement of a part and may be employed with special advantage in drill-presses or vertical milling-machines for feeding the spindles which carry the drills or cutting-tools.

The mechanism comprises a sun-gear and a differential gear which is given a slow rotary movement by planet-gears connecting said sun-gear and differential gear and revolving about the sun-gear and also comprises means for throwing the planet and sun gears out of action and revolving the differential gear in unison with the planet-gear carrier. The differential gear may be connected through any suitable gearing with the part to be fed or moved and said part be given a very slow feed or accurate adjustment by throwing the sun and planet gearing into action, or the part may be given a rapid feed or quick adjustment by throwing the sun and planet gearing out of action and rotating the differential gear in unison with the part which carries or revolves the planet-gears.

In describing in detail one form of mechanism in which the invention may be embodied reference will be made to the accompanying drawings, in which the preferred form of the invention is shown embodied in a vertical-spindle milling-machine.

In the drawings, Figure 1 is an elevation of so much of a milling-machine as is necessary to show the application of the invention thereto. Fig. 2 is a horizontal sectional view through the feed-shaft, and Fig. 3 is a detail showing a means for limiting the feed of the spindle.

In the machine illustrated the mechanism for feeding or adjusting the spindle is operated manually through a hand-wheel 1, connected with a feed-shaft 2; but it will be understood that the mechanism may be power driven if it is desired to use said mechanism for effecting an automatic feed of the spindle.

The hand-wheel 1 is connected with the shaft 2 through a sleeve 3, to which said wheel is secured and which is mounted in a bearing 4. The shaft 2 passes through the sleeve 3, being keyed thereto and arranged to move longitudinally therein for a purpose to be explained. A sun-gear 5 and a differential gear 6 are loosely mounted on the shaft 2 and are connected by planet-gears 7 and 8, mounted on a carrier 9, keyed to the shaft. The gears 5 and 6 are located on opposite sides of the carrier 9, and said gears and carrier are held in position on the shaft between a collar or flange 10, which engages gear 5, and a nut 11, which engages gear 6. The planet-gears 7 and 8 are connected by a shaft 12, mounted in the carrier, and two or more sets of such gears may be used, if desired. In order that the gear 5 may act as a sun-gear, about which the gear 7 may revolve or may be thrown out of action, means are provided for holding said gear stationary and releasing said gear, which means in the construction shown consists of a clutch 13, one part of which is formed on the hub of gear 5 and the other part of which is formed on a sleeve 13', which supports and forms the bearing for one end of shaft 2.

The gears 5 and 6 differ slightly in diameter and have a different number of teeth, so that when gear 5 is held stationary and the planet-gears revolved about it the gear 6 will be given a very slow differential movement. In the embodiment shown the gear 6 should be rotated in the same direction with the shaft 2 at all times, and the gear 6 is therefore the larger, having one more tooth than the sun-gear 5, and therefore being rotated a distance of one tooth in the direction of the rotation of shaft 2 during each revolution of said shaft. When a fast feed or quick movement is to be given to the part to be fed or moved, the sun and planet gears are thrown out of action by disengaging the clutch 13, and the gear 6 is connected to revolve in unison with the feed-shaft and planet-gear carrier, so that said gear makes a revolution for each revolution of the shaft or carrier. The gear 6 is connected to revolve with the shaft 2 by a clutch 14, one part of which is formed on the sleeve 3 and the other part of which is formed on the hub of gear 6. The clutches 13 and 14 are engaged and disengaged by moving the shaft 2 longitudinally, a knob 15 being secured to the end of the shaft for convenience in moving the same.

The gear 6 may be connected with the part to be moved, which in this case is the spindle-carrying head, by any suitable gearing. One simple form of such gearing consists of an intermediate gear 16, mounted on a shaft 17 and connecting gear 6 with a gear 18 on the end of a shaft 19, which carries a pinion 20, engaging a rack 21, secured to the spindle-head 22. The spindle-head is mounted to slide on ways 23 and supports and carries the spindle 24. The spindle is driven by a pulley 25, through which it passes and with which it is connected by a key and slot in the usual manner.

The described construction provides a simple and efficient mechanism for effecting a fine and accurate feed and a rapid return or quick feed, and the change from the fine to the quick feed may be quickly and conveniently effected.

When the mechanism is employed as in the machine described for effecting a hand-feed or adjustment of the spindle-head, it is desirable to use an adjustable stop mechanism in connection therewith for limiting the feed or determining the movement of the head, and a further feature of invention relates to such a stop mechanism. The preferred form of such mechanism is that shown, which is as follows: A screw-rod 26 is secured to the arm 27 and extends down within a recess in the head 22. A nut 28 is mounted on the screw-rod within the recess in the head and is arranged to be engaged by a shoulder in the form of a plate 29, which surrounds rod 26 and closes the upper end of said recess. The nut is adjusted by means of a sleeve 30, mounted in the said recess and surrounding said nut, the sleeve being connected with said nut by means of a feather 31 on the side of the nut, which projects into a slot 32 in said sleeve. The sleeve extends down through the head and is connected at its lower end to a shaft 33, provided with a shoulder 34, which rests on a sleeve 35, secured to the head. The shaft 33 extends through the sleeve 35 and is provided at its lower end with a knurled knob 36 for turning the same and sleeve 30. When the head is moved, the sleeve 30 passes over the nut until the plate 29 engages said nut, when the movement of the head is arrested. By turning the knob 36 the nut may be adjusted on the screw-rod as desired.

This application is a division of application Serial No. 707,298, filed March 1, 1899.

What I claim as my invention, and desire to secure by Letters Patent, is—

The combination of a rotatable and slidable shaft, a sun-gear loosely mounted on said shaft, a differential gear loosely mounted on said shaft, a planet-gear carrier secured on said shaft and rotated thereby, planet-gears mounted in said carrier and connecting said sun and planet gears, a stationary clutch member for engaging said sun-gear, and a clutch member secured to revolve with said shaft, whereby a sliding of said shaft will serve to engage one of said clutch members and to disengage the other, substantially as described.

CHARLES R. GABRIEL.

Witnesses:
 W. H. THURSTON,
 J. H. THURSTON.